United States Patent [19]
Bowers

[11] Patent Number: 5,465,748
[45] Date of Patent: Nov. 14, 1995

[54] SANITIZABLE SLIDER DIAPHRAGM VALVE

[75] Inventor: William F. Bowers, Topsfield, Mass.

[73] Assignee: Millipore Corporation, Bedford, Mass.

[21] Appl. No.: 248,138

[22] Filed: May 24, 1994

[51] Int. Cl.⁶ .................................................. F16K 11/074
[52] U.S. Cl. ............... 137/240; 137/246.22; 137/625.11
[58] Field of Search .............................. 137/240, 246.17, 137/246.18, 246.19, 246.22, 625.11

[56] References Cited

U.S. PATENT DOCUMENTS

| | | | |
|---|---|---|---|
| 3,240,225 | 3/1966 | Barrows | 137/240 |
| 4,191,213 | 3/1980 | Dölling et al. | 137/625.11 X |
| 4,564,043 | 1/1986 | Trittler | 137/625.11 X |
| 4,658,853 | 4/1987 | Pennington | 137/240 |
| 4,757,834 | 7/1988 | Mieth | 137/240 X |
| 5,127,429 | 7/1992 | Kempf et al. | 137/240 |
| 5,311,899 | 5/1994 | Isayama et al. | 137/240 |
| 5,375,622 | 12/1994 | Houston | 137/240 |

*Primary Examiner*—John Rivell
*Attorney, Agent, or Firm*—Andrew T. Karnakis

[57] ABSTRACT

A sanitary slider valve shown specifically as a rotary carousel diaphragm valve which has a thermoplastic elastomeric diaphragm integrally molded to form the multiple sealing ports of the rotor/stator interface is described. Ports or grooves molded into the face of the elastomeric diaphragm are positioned to sealably engage grooves or ports in the stator face, and to form sanitary elastomeric tubular ducts leading through the body of the rotor or of the stator, terminating as elastomeric flanges. These flanges permit direct connection to sanitary flared piping flanges within the carousel which lead to and from multiple columns or other solid phase bed segments, or to sanitary flared piping flanges connecting the stator to piping interconnecting the multiple carousel columns to each other and to external supply and collection lines. Sanitary operation is made operable by energized flexible diaphragm wiping lip seals which maintain fluid-tight sealing engagement with the opposing face even when the rotor is lifted off the stator far enough to permit cross flushing of the port sealing faces with sanitizing fluid. The valve permits sanitary operation of advanced chromatographic separations of biopharmaceuticals, including simulated moving bed chromatography.

19 Claims, 9 Drawing Sheets

SANITIZABLE SLIDER DIAPHRAGM VALVE

BACKGROUND

1. Field of the Invention

This invention relates generally to the field of fluid handling and liquid chromatography. In particular, the invention is directed toward a novel sanitizable rotary valve that may be used in conjunction with liquid chromatographic columns and sanitary liquid handling systems to separate and/or purify biological macromolecules of importance to the pharmaceutical industry.

2. Description of the Prior Art

Rotary valves have been used for multiple fluid distribution in many different variations. For instance, U.S. Pat. No. 4,808,317 (Berry et al.) is directed to a method and device including a rotary valve for continuously contacting fluids with solid particulates. The design of this fluid distribution valve also allows simulated moving bed ("SMB") counter-current operation. In general, the device operates as follows. A plurality of inlet conduits are provided at the top of a feed box for the purpose of introducing fluid streams into the device for treatment, and a corresponding plurality of outlet conduits are provided at the bottom of the discharge box for removing treated fluid streams. Separator compartments are located so that they rotate past the fluid ports. In normal operation the separator compartments contain a resin or other adsorbent particulate bed which is then sequentially contacted with each fluid stream through the upper and lower timing crown stator ports. Details of the operation of the rotary valve are presented in the '317 patent's FIGS. 5 and 7 through 9. As can be seen from these figures, the rotor and stator must be fully disassembled for cleaning and no provision has been made for sanitizing the contact faces of the rotor and stator surfaces.

U.S. Pat. No. 2,985,589 (D. B. Broughton et al.) is directed to a process and apparatus for continuous simulated counter-current flow to and from the several inlets and outlet streams in relation to beds of solid sorbent. A rotary valve is described for connecting the inlet and outlet fluid streams to the adsorbent bed columns. The process and apparatus are demonstrated by separating a mixture of normal and isohexanes into a stream of relatively pure N-hexane and a secondary product of isohexane. The apparatus comprises a series of 12 beds containing molecular sorbent. The rotary valve used is not sanitizable, and there is no indication that a sanitizable valve face was contemplated.

U.S. Pat. No. 3,268,604 (D. M. Boyd, Jr.) is directed to a fluid flow control system for simulated moving bed processes which include a rotary valve. A multi-port rotary distributing valve is shown in FIG. 1, which is capable of being connected to 24 fluid transfer lines. The valve does not have any sanitizing feature.

U.S. Pat. No. 4,409,033 (LeRoy) is directed to a simulated moving bed separation process for high capacity feed streams, and incorporates a fluid distribution means comprising a rotary valve. Again, no sanitizable aspects are disclosed.

Known non-rotary sanitizable valves include Mieth, U.S. Pat. Nos. 4,757,834 and 4,687,015; and Dolling 4,191,213. Also known are rotary valves granted to Ringo, U.S. Pat. No. 2,706,532 and Pruett, U.S. Pat. No. 3,451,428. The latter two patents disclose no sanitary flushable design.

U.S. Pat. No. 4,921,015 (Sedy) is directed to a rotary vacuum valve having two annular continuous pressurized chambers formed in the sealed face of the rotor. In each chamber are a pair of annular U shaped elastomeric Teflon™ seals expanded by an expansion spring positioned concentrically within the open sides of the seals. These seal assemblies are known as spring-energized TFE lip seals. The stator and rotor move slightly apart upon the application of high pressure to the stator, the lift being sufficient so that the spring-loaded TFE lip seals have a slight contact with the top of the ring, allowing the seal faces to run dry. Thus the arrangement presents a dry low friction seal between the two valve members. No sanitizable or flushable means are provided.

U.S. Pat. No. 4,625,763 (Shick et al.) is directed to a disc-axial multi-port valve for accomplishing the simultaneous interconnection of a plurality of conduits. The valve is comprised of a stator and a rotor, both being comprised of two sections, one being cylindrical and the other being disc-like. FIG. 1 discloses a peripheral seal element 94 retained in a grove in the rotor discular element and urged against the stator transfer face by springs such as 92t. Any fluid leaking from the transverse volume will be retained by this barrier. In addition, in order to prevent cross contamination among the conduits which are interconnected, a flushing fluid may be passed through the transverse volume. Referring again to FIG. 1, flushing fluid may be provided to transverse volume 90 via conduit 95. However, no arrangement is made for pulling apart the faces of the rotor and stator in order to sanitizably flush the faces.

Aseptic diaphragm valve construction, or sanitary valves, are known in the art. These valves are used for aqueous fluids containing or capable of containing microorganisms, or for handling of foods, beverages, or of materials being made into pharmaceuticals or the like. For example, Hoobyar et al. U.S. Pat. No. 5,152,500 disclose an outlet valve wherein a shaft that moves up or down and is covered by a diaphragm bellows thereby engages or disengages a round inlet opening, thereby closing or opening the valve opening surrounding the inlet. The aseptic nature of the valve involves isolation of contaminants by way of a double axial seal and also its self-draining nature. However, the diaphragm valve does not have a multiple-port capability.

U.S. Pat. No. 5,273,075 (Skaer) discloses a diaphragm-based diverter valve with a single inlet and two outlets. The diaphragm engages a weir to open or close a fluid path. Stems are compressed against the diaphragms to close them against the weirs, or opened to create a fluid flow path. According to the patent, dead legs are eliminated in this design.

It is clear that valve designs for sanitizing slider or rotary valves in place without the need for disassembly have not been described in the prior art. In order for the advantages of rotary valve-based separations to be applied to process-scale manufacture of pharmaceuticals, it is mandatory to provide sanitizing means for ensuring removal of contamination within the wetted surfaces of the valve following use, without the need for disassembly. Therefore, there is a need for sanitizable rotary valves which may be intermittently flushed and cleaned, while maintaining the sterile condition of the process system.

SUMMARY OF THE INVENTION

The inventor has designed a completely new type of valve which combines some elements previously found in the valve art, but in addition adds the unique feature of partial (sealed) separation of the rotor-stator faces to allow flushing across the process fluid-contacting surfaces. The partial separation would normally result in sanitizing fluid leaking out of the valve resulting in non-aseptic operation, but a novel diaphragm-like elastomeric seal has been invented which functions to both seal the two faces together in normal use, and also to retain the sanitizing process fluids when the faces are partially separated for cleaning. This design allows the unique sanitary operation of the valve that is disclosed herein,the ability to sanitize in place ("SIP") without disassembling the valve.

The unique operation of the valve is performed by a new type of slider (or rotary) valve shown specifically in a rotary carousel diaphragm valve which has a thermoplastic elastomeric diaphragm integrally molded to form the multiple sealing ports of the rotor face. Ports or grooves molded into the face of the elastomeric diaphragm are positioned to sealably engage grooves or ports in the stator face, and to form sanitary elastomeric tubular ducts leading through the body of the rotor, terminating as elastomeric flanges. These flanges permit direct connection to sanitary piping flanges within the carousel which lead to and from multiple columns or other solid phase bed segments.

To permit periodic sanitization and cleaning of the port sealing faces of the stator and rotor, the external limit of the elastomeric rotor diaphragm is molded to form a flexible wiping lip seal which maintains fluid-tight sealing engagement with the face of the stator even when the rotor is moved orthogonally away from the stator far enough to permit cross flushing of the port sealing faces.

In the preferred embodiment, the required sealing force is minimized by relieving material from either the surface of the stator or from the rotor diaphragm to form port-sealing ledges and adjoining gutters. The gutters may carry a barrier fluid stream which is used to capture and sweep away any process fluid which escapes from the port seals. This feature prevents accumulation of dried material which may damage the sealing faces, and ensures containment of material which might otherwise constitute an environmental hazard to workers in the area.

The invention is directed to a sliding multi-port diaphragm valve having at least two inner surfaces, comprising: a rotor having a body wherein the inner surface is a stator-facing surface, the rotor body having at least a pair of first and second connection ports in fluid connection with rotor ports located on the stator-facing surface, the rotor having attached to the stator-facing surface a sealing means comprising a diaphragm, the diaphragm having a plurality of rotor port sealing means and at least one diaphragm-integral dynamic wipe sealing lip; a stator having a body wherein the inner surface is a rotor-facing surface, the stator body having at least a pair of first and second connection ports in fluid communication with stator ports located on the rotor-facing surface, the stator ports being fluidly connected to their respective connection ports; means for at least one SIP/ barrier gutter located on an inner surface of the valve; orthogonal actuating means for incrementally adjusting the rotor perpendicular to its direction of linear motion; fluid connection means for fluidly connecting stator and rotor connection ports to externally located fluid sources and receivers and chromatographic separation devices; and actuating means for moving the rotor body thereby indexing the ports. The SIP/barrier gutter(s) is(are) located either on the diaphragm or on the face of the stator.

The invention is also directed to a multi-port sliding valve of the type having a linear slider, a stator having a plurality of connection ports and associated channels in liquid communication with external fluid sources and separation means, the improvement comprising: a sealing means comprising a diaphragm, the diaphragm having at least one slider port sealing means;

at least one connection port capable of being in fluid communication with a source of SIP fluid, and ports comprising channels through the stator body fluidly connected to their respective connection ports; and orthogonal separation means for partially separating the slider body from the stator body thereby allowing flushing of sanitizing fluid across the stator face without loss of fluid to the outside.

This invention is also directed to an insert molding process for forming in place a rotary valve diaphragm seal, comprising the steps of: affixing a mold base to the rotor which provides a negative impression of the desired diaphragm surface; capping the ports of the rotor with flange-forming plugs containing channel-forming cores, the cores extending through the connection port channels to seat in holes in the mold base; affixing injection molding equipment to said capped rotor; injecting the rotor with an elastomer suitable for forming a diaphragm seal; curing the diaphragm seal; and removing the mold and caps, thereby exposing a diaphragm molded in place having the desired surface features.

An object of this invention is to provide a sanitizable slider valve in which the port-sealing faces of the slider and stator may be intermittently flushed and cleaned, while maintaining the sterile condition of the process system.

Another object of this invention is to provide a slider valve having a fluid barrier stream which continually purges the external limits of the port-sealing faces to prevent accumulation of dried material and release to the external environment of the solution being processed, while permitting connection of ducts from the ports in the face of the slider to and from multiple solid phase bed segments mounted in an attached carousel.

A further object of this invention is to provide a simple and reliable elastomeric means of ensuring sealing of all ports in a slider valve which is tolerant of imperfect flatness or parallelism of the stator or slider sealing faces, which is not damaged by particulate contamination in the process solution, and which maintains an acceptable sealing integrity over a useful life at least equal to that of typical chromatographic beds used for pharmaceutical manufacturing purification processes.

A further object of this invention is to provide simple means to remove and remotely store the rotor carousel in a sanitary sealed state, to clean and store the stator in a sanitary sealed state, and to permit sequential operation of different rotor carousels on the same stator actuator assembly.

These and other objects and advantages of the invention will become apparent in the following detailed description of the preferred embodiments, in conjunction with the drawings.

DETAILED DESCRIPTION OF THE INVENTION

Definitions.

The following terms used throughout the specification shall have the following meaning:

"Diaphragm" is used when referring to a generally elastic sealing surface that is urged against a second surface to effect a seal.

"Dynamic wipe sealing lip" is used to refer to a specific integral construction of an elastomeric lip seal used at the sealing edge of the diaphragm. The lip is dynamic in that it has spring action either from a spring insert or inherently.

"Make-before-break" groove is an area on either the slider or stator sealing surface that channels fluid from one channel located in the slider or stator body to another channel. It comprises a groove or ditch cut into the respective surface and terminates at one end in a port or hole that fluidly connects to the channel through the stator or slider body. Make-before-break grooves are commonly known for alleviating the pressure surges that can otherwise stress piping and pumps when fluid flowing under pressure is suddenly diverted from one conduit into another through a valve which interrupts flow continuity.

"SIP" is an acronym for "sanitize-in-place", which describes the action of partially separating the sealing surfaces of the slider (or rotor) and stator and then flushing sanitizing fluid across the sealing faces of the stator and the diaphragm.

A. Preferred Embodiments of the Invention

Figure 1A:
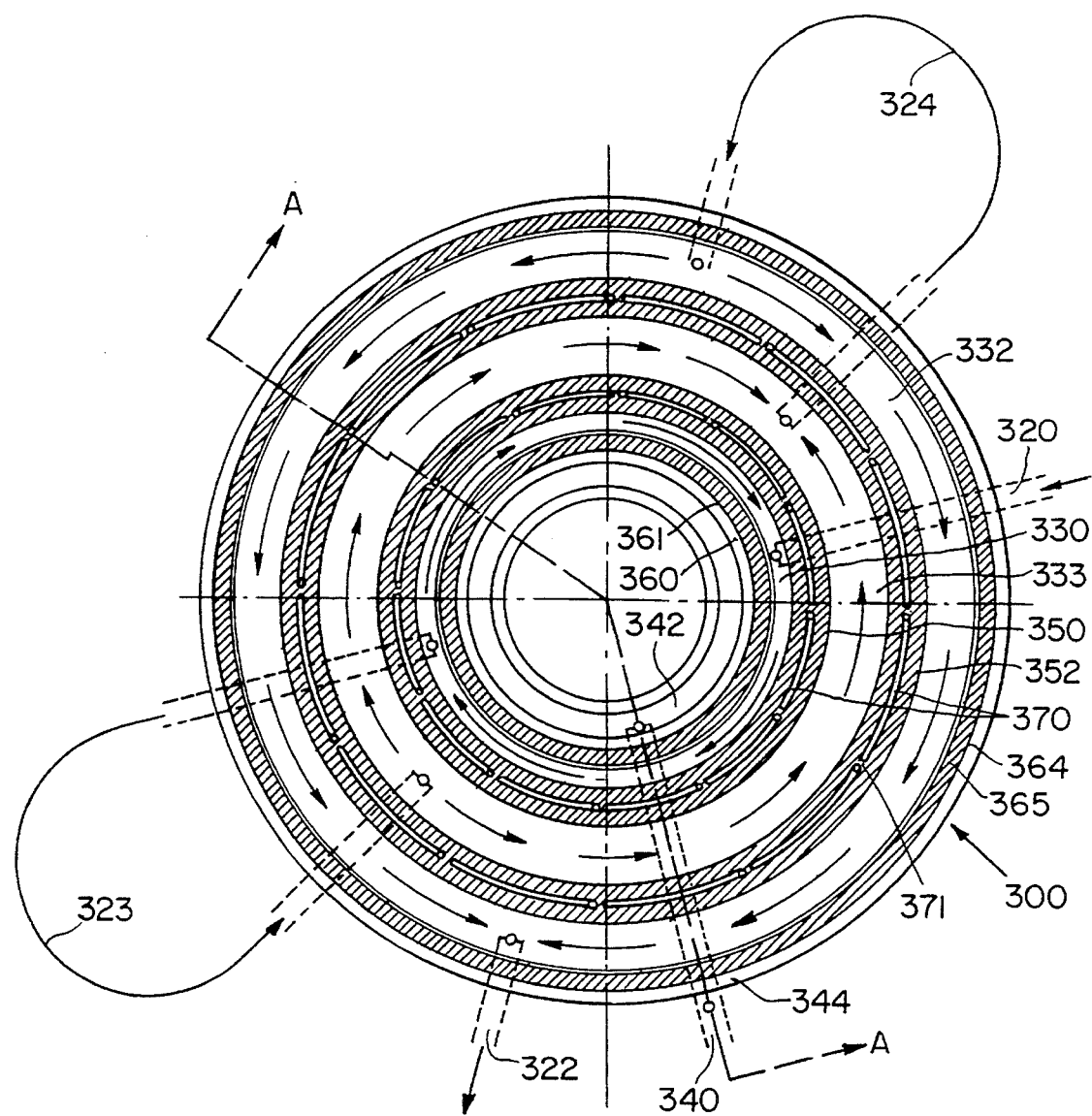
FIG. 1A is a drawing of a bench-scale embodiment of the present invention showing a top view of the stator face with the barrier fluid flowpath illustrated by arrows, with rotor not shown.
Figure 1B:
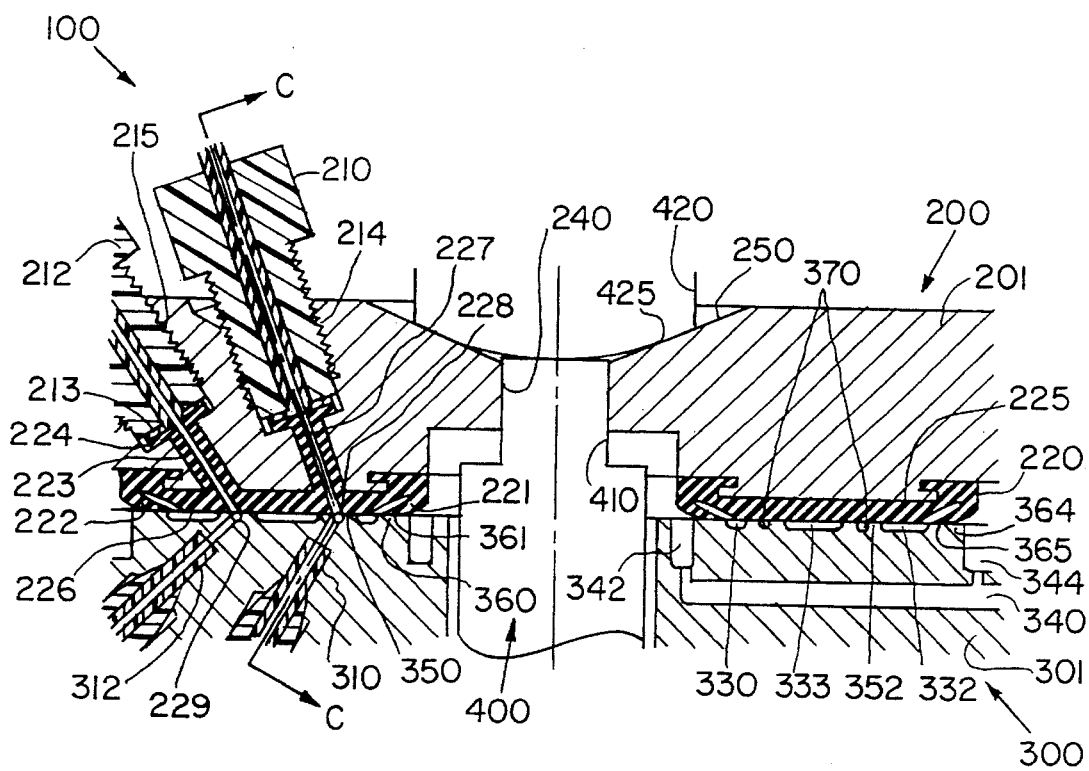
FIG. 1B is a transverse sectional view along line AA taken through the valve of FIG. 1A and a pair of inlet and outlet fittings, showing the valve while rotating during normal operation, just as stator and rotor ports are aligned, with the right side showing the stator sump drain port.

FIGS. 1–2 show plan views of the stator 300 and transverse sections through the stator and rotor 200 of a bench scale embodiment of the present invention. Stator 300 incorporates actuating and fluid connecting means connected to the bottom portion of stator body 301, which may be formed from ceramic material, or be machined from stainless steel, preferably 316L alloy for corrosion resistance, or from a variety of engineering plastics such as Kel F (polychlorotriflouroethylene or PCTFE), polyphenylsulfone (PPSU), polyphenylene sulfide (PPS), polythalamide (PPA), polyetheretherketone (PEEK), or other high performance materials having good resistance to abrasion and to sodium hydroxide commonly used for cleaning and SIP. With reference to FIG. 1B, the rotor 200 of this embodiment contains 12 pairs (only 1 pair being shown) of first column connection fittings 210 and second column connection fittings 212 engaging mating threads in holes in first rotor connection port 214 and second rotor connection port 215 in the top face of rotor body 201. Rotor body 201 is not normally wetted, thus it may be machined from aluminum or machined or molded from any high temperature engineering thermoplastic resin which will maintain integrity during brief exposure to a secondary insert molding operation at temperatures from about 120° to about 400° F. Suitable materials might include polysulfone, PEEK, or PPS. The fittings shown are commonly available, made from plastic such as polyethylene or polypropylene, with a ¼-28 UNF thread machined or molded in. These secure the flanged ends of tubes 213, which may be fashioned from Teflon® or Tefzel® or polyethylene or polypropylene or other suitable thermoplastic tubing, and serve to provide a sanitary means to fluidly connect to the inlets and outlets of a plurality of columns mounted in a carousel attached to the rotor, which is not shown in these closeup views.

In practice, any column or solid phase medium may be used. For instance, functionalized ion exchange, hydrophobic interaction, affinity, metal chelate, or size exclusion resin columns may be used to separate biomolecules such as proteins or peptides. Pharmaceuticals may be separated by ion exchange, chiral, or reverse phase media, etc. The specific type of column or media employed or molecules to be separated are not limiting.

The primary objects of this invention are served by the presence of an elastomeric diaphragm 220, which is fashioned as an integral insert molded part of the base of rotor 200. Suitable materials for the diaphragm are thermoplastic elastomers such as styrene-ethylene/butylene-styrene block copolymers, for example the KRATON™ G rubbers (Shell Chemical Co. Houston, Tex.) such as KRATON G 2705. This is an untilled injection moldable elastomeric rubber made and sold for FDA regulated food contact and pharmaceutical applications which is steam sterilizable, inert to sodium hydroxide, and has passed acute toxicity extractables testing including USP XIX, Class VI (121° C.), and the Cumulative Toxicity Index. Other examples of potentially suitable thermoplastic elastomer materials for sealing of a pharmaceutical valve are discussed by Marecki in "Device for Delivering and Aerosol", WO93/22221, which is included by reference here in its entirety.

Diaphragm 220 has a first diaphragm surface 225 which is in contact with the mating bottom surface of rotor body 201, and a second diaphragm surface 226 which is in direct contact with the fluids passing through the valve, and is in selective sealing contact with portions of stator 300 as described below. As shown in FIG. 1B, diaphragm 220 is molded to provide hollow sleeves 223 which extend upward from first diaphragm surface 225 through rotor body 201 to terminate in integral flange gaskets 224 making sanitary sealing fluid connection to ranged column connecting tubes 213. Sleeves 223 are hollow, each containing a sleeve duct 227 which fluidly connects the bore of ranged column connecting tube 213 with its respective first rotor sealing port 228 or second rotor sealing port 229.

Diaphragm 220 also includes first and second integral dynamic wipe sealing lips 221 and 222, which, along with integral flange gaskets 224, form the physical delimitation between first diaphragm surface 225 and second diaphragm surface 226. The dynamic wipe sealing lips have a flexible vee shape with the point angled inward toward the fluid carrying region of the valve, with the axis of the relaxed vee as molded forming an angle of between about 15 to 45 degrees, preferably 40 degrees from the plane of the stator/rotor seal, and the point of the relaxed vee as molded extending about 0.02 to 0.035 inch, preferably 0.028 inch below the mating surface of the stator when the stator is brought into fluid sealing engagement with rotor sliding sealing ports 228 and 229. The resulting fully flexed sealing engagement of lips 221 and 222 when rotor 200 is sealed to stator 300 is shown in FIG. 1A as shaded first and second barrier sealing zones 361 and 365, respectively.

When forming diaphragm 220 as an integral attachment to the base of rotor body 201 by insert molding, rotor body 201 is mounted to a mold base which has a shape to form second diaphragm surface 226 in the inner and outer circumferential limits of first diaphragm surface 225, and which has a plurality of holes at the desired positions of first and second rotor sealing ports 228 and 229. Hollow threaded plugs with ends shaped to form integral flange gaskets 224 and containing channel-forming cores of diameter to form sleeve ducts 227 are screwed into each rotor connection port 214 and 215 such that the cores engage the holes in the mold base. The molten thermoplastic polymer is then injected through a runner preferably located in the center of rotor body 201. When the elastomer has cooled, the threaded plugs and core wires are removed, the mold is opened, and the central runner is sliced away.

Another embodiment of this invention would place the elastomeric diaphragm seal in the opposite orientation, i.e., instead of the diaphragm being adapted for and adhered to the rotor, it may equally be designed to function on the stator face. This embodiment is not shown in the drawings, but given the teachings above, one of ordinary skill in the art would be able to adapt one specific embodiment to the opposite orientation.

With reference to FIG. 1B, the center of rotor 200 has means provided to connect to an actuator shaft 400. An elongated rotor drive slot 240 extends through the center of rotor 200 and loosely engages matching actuator rotating flats 410 machined into the sides of shaft 400. When shaft 400 is periodically rotated by a pneumatic or electric indexing means not shown, but known to those versed in the art, first and second rotor sealing ports 228 and 229 are caused to move while remaining in sliding sealing engagement with the respective stator first port sealing ledge 350 and second port sealing ledge 352. With reference to FIG. 3, this actuation sequence is shown from an initial indexed position of each first rotor sealing port 228 at one end of its respective stator make-before-break groove 370 in FIG. 3A, through a traversing position of FIG. 3B, to a bridging make-before-break position shown in FIG. 3C in which fluid momentarily flows to or from each stator first connection port 310 to or from two adjoining rotor sealing ports 228, through final indexed position seen in FIG. 3D in which each first rotor sealing port 228 has been advanced by one position to the right along stator first port sealing ledge and zone 350.

Figure 2B:
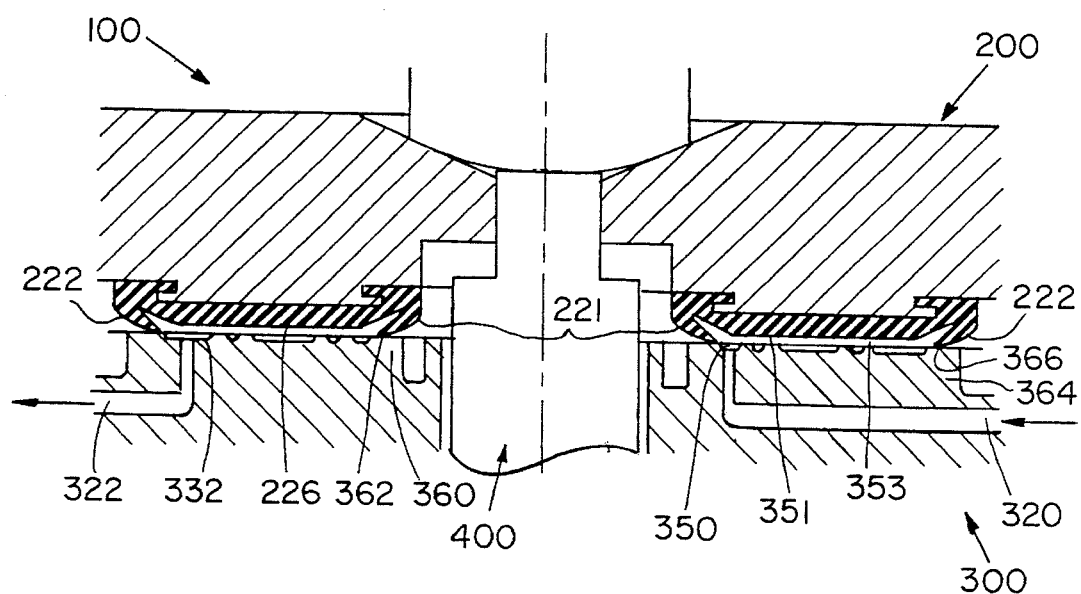
FIG. 2B is a transverse sectional view along line BB of FIG. 2A through both inner and outer barrier/SIP stator ports.
Figure 2A:
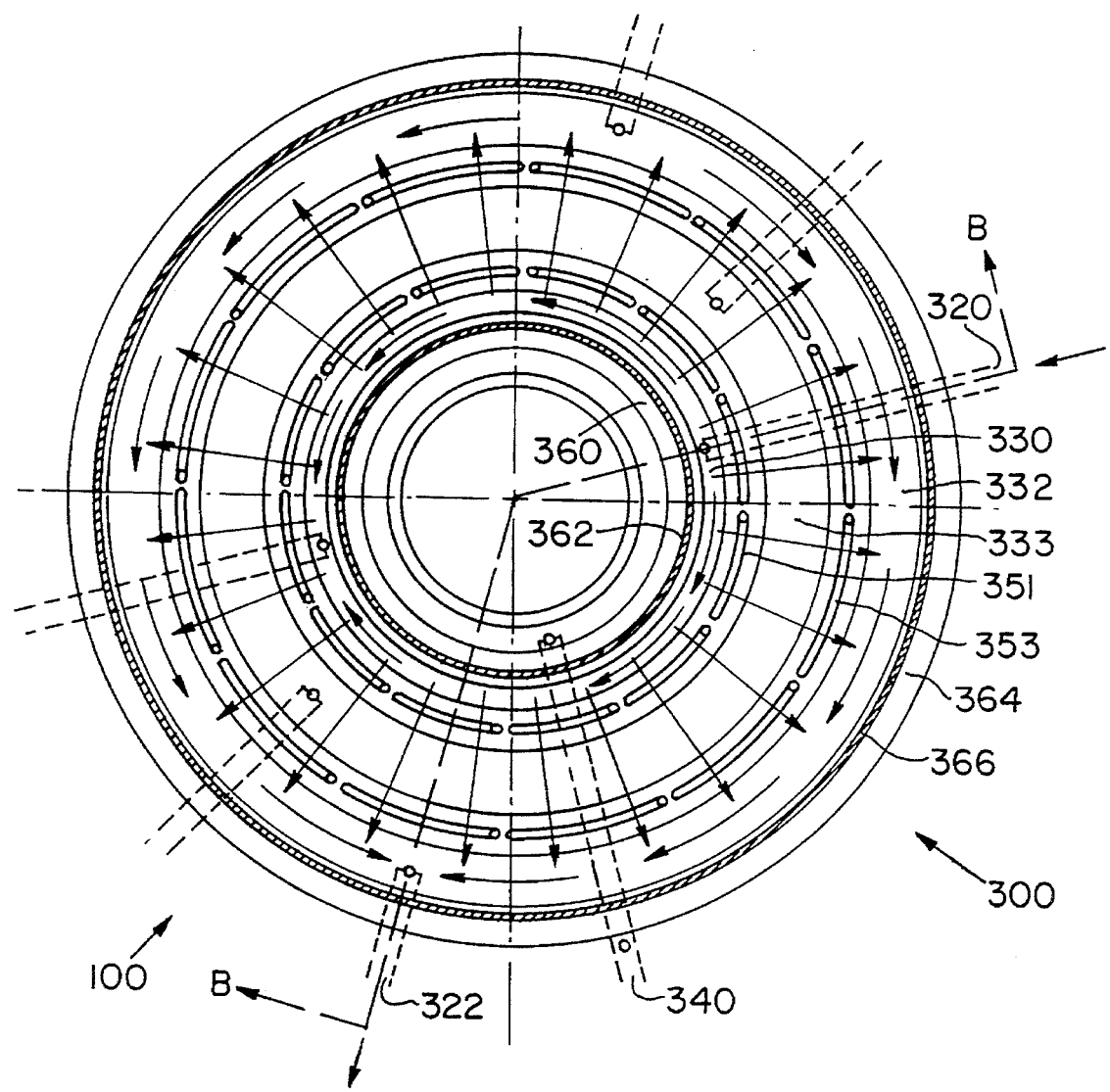
FIG. 2A is a drawing of the bench scale embodiment of FIG. 1 showing a top view during SIP mode of the stator port sealing ledges, with rotor not shown.

Again with reference to FIG. 1B, actuator locking nut 420 is secured to the top of actuator shaft 400 by threads (not shown). Nut 420 has a rounded locking nut engagement shoulder 425 which bears on rotor engagement cone 250 machined into the top surface of rotor 200. These elements provide a simple universal swivel joint coupling whereby downward force applied to actuator shaft 400 is uniformly applied both in order to center rotor 200 and to urge second diaphragm surface 226 into sealing engagement with mating portions of stator 300, as seen in FIG. 1B, without regard to exact perpendicularity to shaft 400 or the planarity of surface 226 or the mating portions of stator 300. Means for orthogonal displacement of actuator shaft 400 (not shown) might include springs, pneumatic or hydraulic cylinders, or motor-driven gears. When actuator shaft 400 is moved upward a controlled distance, for example 0.02 inch as seen in FIG. 2B, integral dynamic wipe sealing lips 221 and 222 are permitted to partially relax and flex downward, thereby elevating rotor 200 and permitting second diaphragm surface 226 to break sealing contact between rotor sealing ports 228 (not shown in FIG. 2B) and the mating top surface of stator 300, while maintaining stator fluid sealing contact by the tips of lips 221 and 222, as indicated schematically by the shaded first and second SIP sealing zones 362 and 366 in FIG. 2A.

The orthagonal adjustability of actuator shaft 400 and rotor 200 in the present invention also permits an optimal balance of negligible loss of process fluid and maximum diaphragm life, in excess of that of the carousel column beds. The greater the downward force applied by actuator shaft 400 to second diaphragm surface 226, the larger will be its sealing footprint with first and second port sealing ledges 350 and 352. This sealing area is represented schematically by the shaded zones 350 and 352 in FIG. 2A. Increased sealing force will minimize or eliminate leakage and loss of process fluid from make-before-break grooves 370 into the adjoining barrier fluid gutters described below. However, use of excessive sealing force will also tend to reduce the lifetime of diaphragm 220, which will eventually need to be replaced as grooves become worn into it by the sliding abrasion of first and second port sealing ledges 350 and 352. Depending on the maximum hydraulic pressure being delivered by the process pumps, a relaxed sealing force during rotation may be programmed which permits only a minute lubricating film loss from the process streams, for example not to exceed 0.1% of the total flowrate, into the first, second and mid-barrier fluid gutters 330, 332, and 333 respectively, during the time that the rotor is being rotated as shown in FIGS. 3A–D, typically 1–2 seconds every 1–5 minutes, and then operation may be returned to the maximum programmed sealing force while the rotor remains in the static indexed position.

Figure 3A:
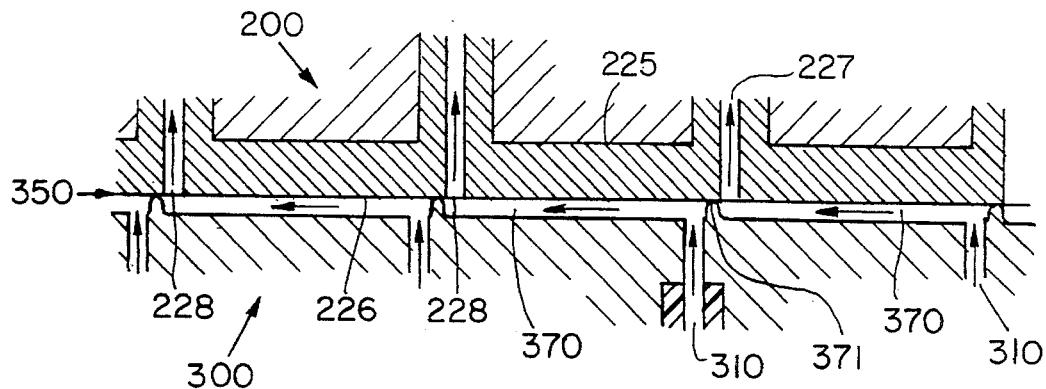
FIGS. 3A–D are a series of sectional close-projections of the rotor and stator ports through conical planes along line CC of FIG. 1B showing the motion of the rotor ports while the rotor is traversing; process solution flow paths are also shown, as is the make-before-break aspect of the invention.
Figure 3B:
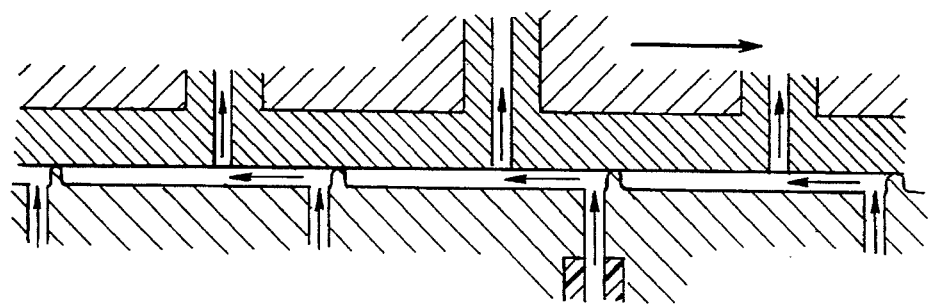
Figure 3C:
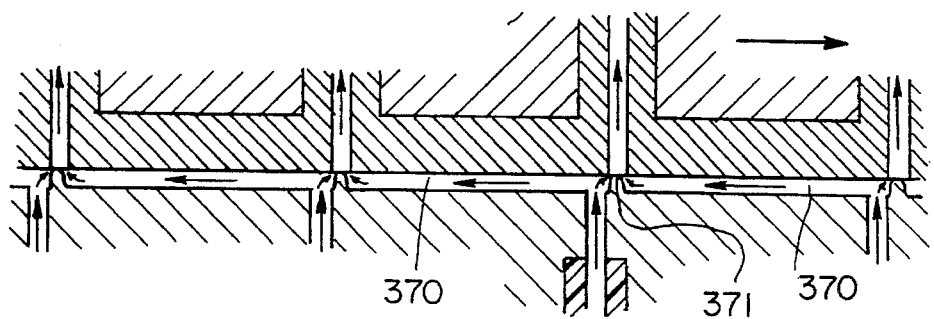
Figure 3D:
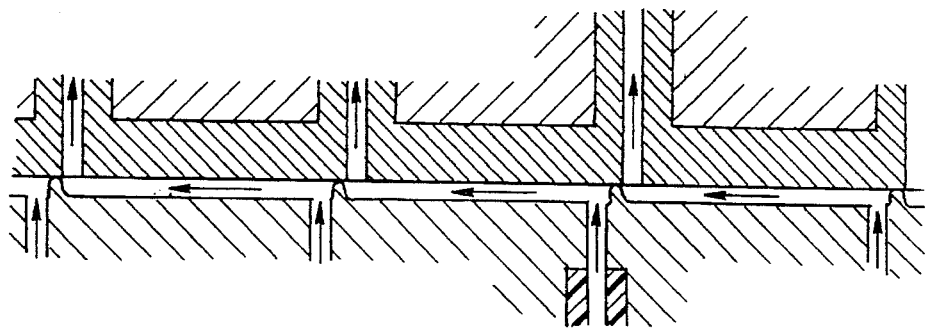

Again with reference to FIG. 1B, stator 300 has connecting ports and ducts for all fluids entering and leaving valve 100. A plurality of paired first connection ports 310 and second connection ports 312 may be used to program the sequence of flow through the plurality of rotor carousel beds, for example as illustrated schematically in FIGS. 7 and 8. In the embodiment shown in FIGS. 1–3, stator connection ports 310 are each fluidly connected to one end of a plurality of make-before-break grooves 370 spaced equally about the top surface of first and second sealing port ledges 350 and 352. As seen in FIG. 1 and FIGS. 3A and 3D, rotor sealing ports 228 and 229 are normally in fluid tight sealing engagement with the other end of grooves 370. This insures that in normal operation there is no unswept stagnant fluid volume in the process flowpath, which would otherwise cause undesirable mixing and loss of separation. As shown in FIG. 3C, adjoining grooves 370 are separated by delimiters 371 which are narrower than the diameter of rotor sealing ports 228 or 229, so that as the sealing ports are passing from engagement with one groove to the next, there is no interruption of flow. This make-before-break feature is needed to permit continuous operation of even high flow rate pumps without pump-damaging shock waves when the valve is rotated.

In normal operation, all sliding valves are known to release a film of liquid which wets the surface of the sliding seal. Release of this liquid to the environment, or damaging accumulation of dried salt deposits, is prevented in the present invention by the use of an integral barrier fluid flow path. As shown in FIG. 1A, barrier fluid, which might typically be sterile water for injection, enters valve 100 through first SIP/barrier connection port 320, which is mounted in the wall of stator 300 beyond the field of view. Barrier fluid flows circumferentially in both directions through first SIP/barrier gutter 330, which is a stator conduit between first SIP/barrier sealing ledge 360, first port sealing ledge 350 and second diaphragm surface 226. This stream cleans the inner side of first port sealing ledge 350, which will preferably be operated feeding the bed inlets, since it has a smaller surface area to carry the higher pressure loads. As shown in FIG. 1A, barrier fluid leaves first SIP/barrier gutter 330 and enters mid barrier gutter 333 by means of first barrier gutter connection 323. Mid barrier gutter 333 is a stator conduit between first and second port sealing ledges 350 and 352 and second diaphragm surface 226. Barrier fluid flows circumferentially through this channel, cleaning the outer side of first port sealing ledge 350 and the inner side of second port sealing ledge 352. From there, the barrier stream passes through second barrier gutter connection 324 to enter second SIP/barrier gutter 332. This is a stator conduit between second port sealing ledge 352 and second SIP/barrier sealing ledge 364 and second diaphragm surface 226. Barrier fluid cleans the outer side of second port sealing ledge 352 and then leaves stator 300 through second SIP/barrier connection port 322, to be carried to a kill tank or other appropriate disposal means. The size of all the barrier channels is deliberately larger and the barrier flow deliberately slower than that of the process channels to ensure that fluid pressure in the barrier channels will always be lower than fluid pressure in the process stream grooves 370. This prevents solutes in the slowly flowing barrier stream from subsequently reentering any of the process streams.

Secondary containment means for any liquid escaping under rotor diaphragm integral dynamic wipe sealing lips 221 and 222, which bear on first and second SIP/barrier sealing ledges 360 and 364, is also provided in the present invention by first and second sumps 342 and 344. These are deep channels in the face of the stator which connect to sump drain port 340, which may be also plumbed to the kill tank.

The primary object of the present invention is shown in FIG. 2B, which depicts the means by which the valve may be aseptically cleaned and sanitized. In normal operation, upon completion of continuous SMB processing of a batch, all stator connection ports 310 and 312 (FIG. 1B) might optionally first be flushed with a salt or other stripping buffer which is strong enough to desorb moderately tightly bound contaminants, and then a strong sanitizing agent such as 1–5N NaOH is recirculated through all the rotor carousel beds to clean and desorb bound materials and foulants. Following this, actuator shaft 400 and rotor 200 are moved upward as described above to permit crossflushing of first and second port sealing SIP cleaning paths 351 and 353 with sanitizing agent which may be valved into barrier/SIP connection port 320. This cycle may then be repeated with a sterile storage buffer, and the rotor left for storage either in the elevated or relaxed rotational pressure position. These positions are preferred for storage, as they will prevent or minimize compression setting of the elastomeric diaphragm, which would otherwise tend to emboss the pattern of the stator gutters and grooves into second diaphragm surface 226, and to reduce the effective cross-sectional area for flow.

Figure 4:
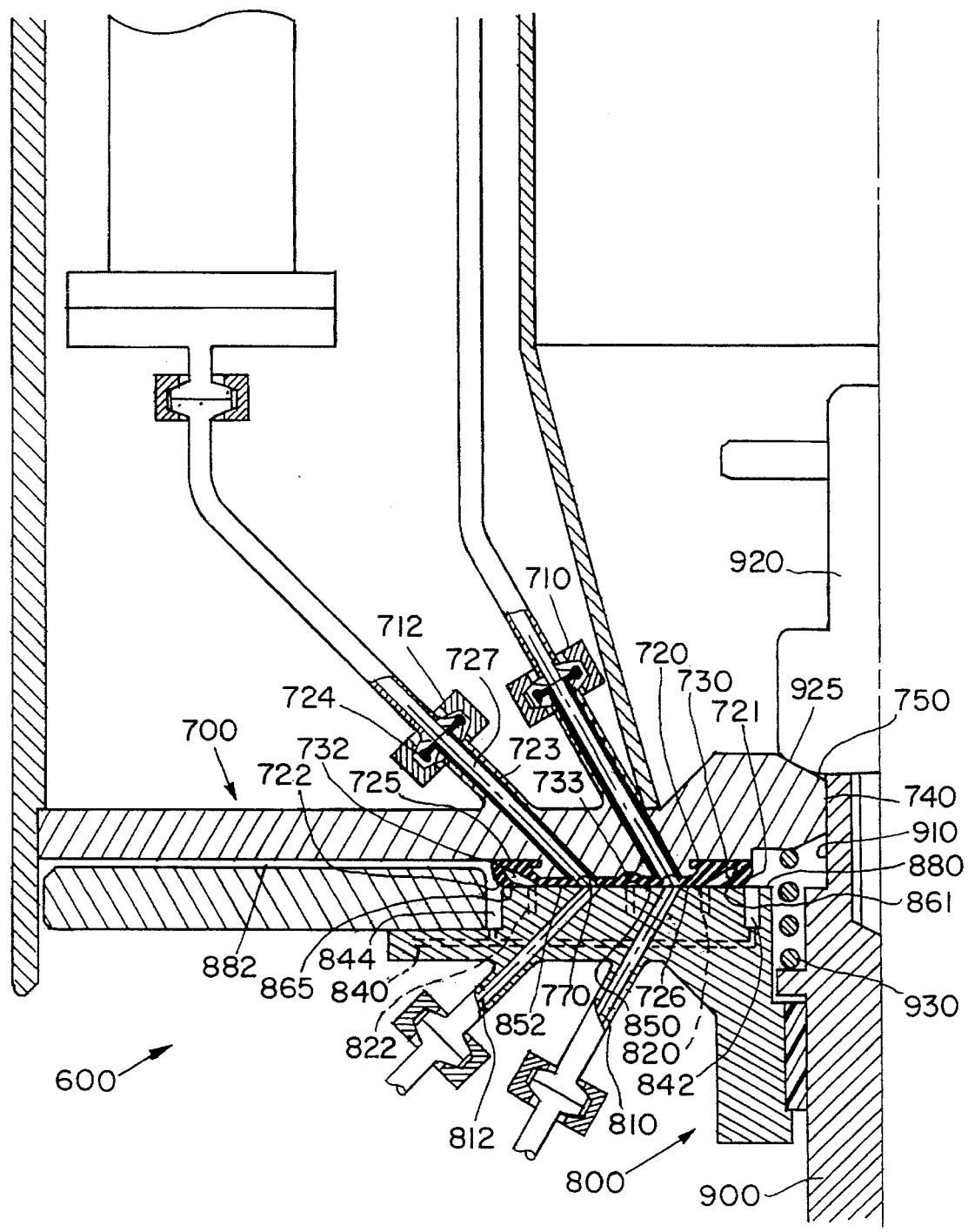
FIG. 4 is a sectional view of the left half of the preferred embodiment of the present invention showing a pilot scale rotor carousel and stator, with all gutters and grooves also molded into the face of the elastomeric rotor diaphragm.

A second embodiment of the present invention is shown in FIG. 4, which is a half transverse section through a pilot scale valve 600. For convenience, the features of valve 600 have been numbered identically, where possible, to those of valve 100, with 500 added. For brevity, only those features which are different will be commented upon.

First and second column connection fittings 710 and 712 are standard ⅜ inch TriClamp™ sanitary tubing connectors with clamps which axially compress the flanges to make a seal against integral diaphragm elastomeric integral flange gaskets 724. Hollow sleeve 723 has a sleeve duct 727 with an approximate bore of 0.2 inch.

The primary difference between embodiments 100 and 600 is that the larger flow channels of pilot scale valve 600, relative to the practical thickness of the diaphragm, permit first and second SIP/barrier gutters 730 and 732 and mid barrier gutter 733, and make-before break grooves 770 of valve 600 to all be molded directly into second diaphragm surface 726. This saves the cost of machining these details into the stator, as deemed necessary for the finer grooves 370 and gutters 330, 332 and 334, which have been placed on the stator to prevent loss of effective cross-sectional area over time due to wear of the diaphragm.

The other feature included in embodiment 600 is elevating spring 930, which is needed to support the greater weight of the rotor carousel. When actuator shaft 900 is relaxed for rotation or elevated for SIP, spring 930 raises rotor 700 to permit unloading or cleaning of first and second port sealing ledges 850 and 852. The use of a spring to transmit upward displacement of actuator shaft 900 in pilot scale embodiment 600 maintains the universal joining aspects of the rotor-to-actuator shaft linkage taught for bench scale valve 100.

B. A Preferred Application of the Invention.

Liquid chromatography is the process of separating a solute dissolved in a flowing or moving solvent from other solutes in the solvent by the differential interaction of the particular solute with a solid phase bed that is packed within a column structure. A solution of liquid phase and solute is flowed or pumped through the solid phase, and the solutes are retained and become separated based on their degree of interaction with the solid phase bed.

In commercial biotechnology separation schemes, some of the resin materials used as adsorption media may cost up to one million dollars a year per separation step. Thus, getting the highest loading, longest life and highest number of cycles possible out of the resin beds can become a key economic consideration. Therefore, regeneration of the adsorbent by desorbing the bound contaminants is crucial to the commercial success of the process.

The adsorption—desorption cycles may be further complicated by the use of flow reversal. Adsorption is done by flowing the feed solution through the resin bed until just before break-through (the point at which the bed is saturated and adsorbate begins to flow through the column). Regeneration can be done in either the same direction as the feed in the adsorption step or in the opposite direction to the feed. When the regeneration fluid (or eluent) flows in the same direction it pushes the adsorbed material ("adsorbate") through the previously clean end portion of the bed. When regeneration occurs by flowing the regenerant in the opposite direction from the original adsorption flow the clean end of the bed stays clean. Flow reversal elution is also often used for adsorption systems because the adsorbate will leave the column as a very concentrated peak. Thus, adsorption columns can serve as concentrators for dilute streams and may be the cheapest way to concentrate.

The productivity of conventional batch elution column chromatography is actually quite low, and the liquid consumption rate is quite high. These limitations arise because only a fraction of the bed is actually used for separation, and because the lower part of the bed may not be fully loaded without loss of product due to breakthrough of the rising concentration front in the emerging mass transfer zone (MTZ). These shortcomings may be overcome through the use of means which cause the solid phase medium to move in a direction countercurrent or opposite to that of the liquid phase, relative to the points of addition and removal of fluid. Actual recirculation of the solid phase has been tried repeatedly, but suffers from loss of the resin by breakage, loss of efficiency due to the increased void volume, and greater complexity.

Figure 5:
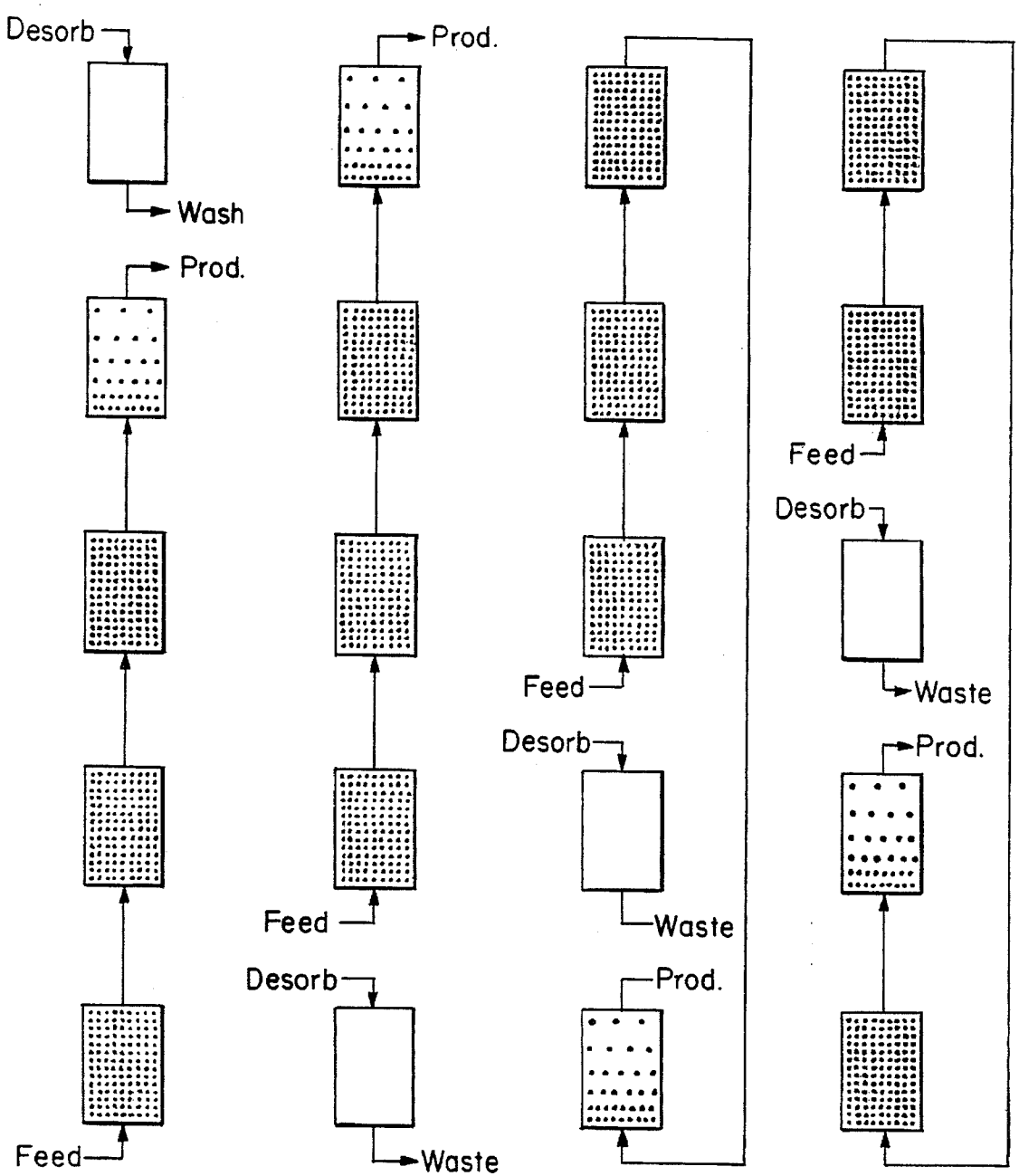
FIG. 5 is a flow schematic diagram of a 5-segment carousel system illustrating the principle of SMB adsorption and separation.

The use of multiple beds to simulate counter-current operation dates back to the Shanks carousel system for leaching soda ash introduced in England in 1841. Carousel bed arrays have been applied to single component adsorption and ion exchange for many years. As shown in FIG. 5, multiple bed segments connected in series are used for adsorption. The adsorbed concentration in the first segment rises to near saturation before the rising concentration in the MTZ in the last segment begins to emerge in the product stream. By switching all connection ports upward in the direction of fluid flow in the adsorption zone, the carousel simulates downward movement of the adsorbent. The switching rate is timed to follow the MTZ, ensuring maximal loading of each bed segment, and continual supply of a freshly regenerated segment for optimal final removal from the product stream. The valved co-current movement of the fluid ports simulates counter-current movement of the bed, hence the name simulated moving-bed (or SMB).

Figure 6:
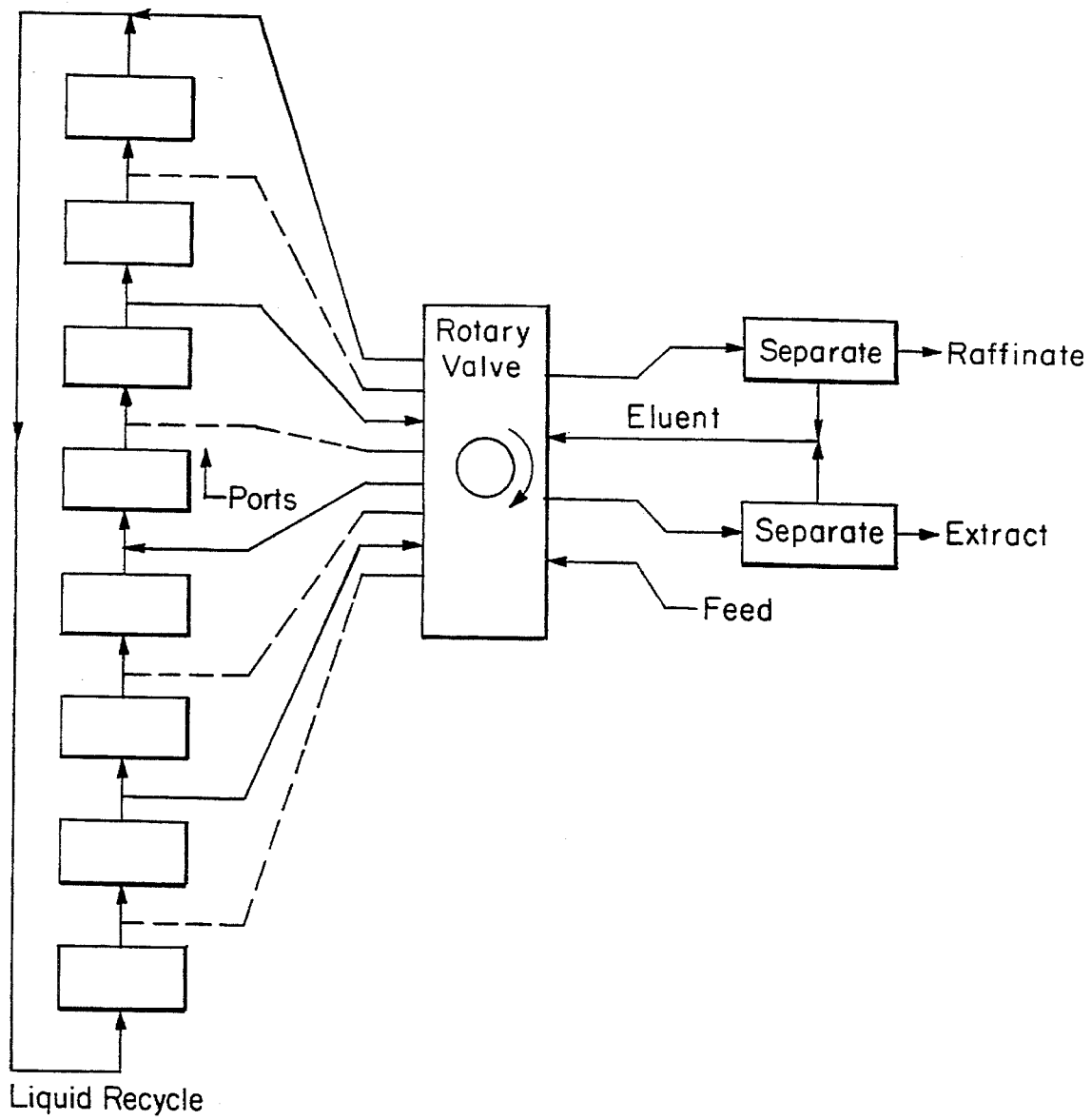
FIG. 6 is a schematic diagram of the Universal Oil Products Sorbex Cascade system for SMB continuous counterflow fractionation.

The first large scale commercial use of simulated moving bed chromatography for fractionation was by Universal Oil Products, as described in U.S. Pat. No. 2,985,589 (Broughton et al.), who introduced the Sorbex Cascade process for fractionation of hydrocarbons, and later for fructose enrichment from glucose and polysaccharides in corn syrup. The Sorbex system employs a complex rotary valve to move feed and eluent inlets and raffinate and extract outlets cyclically along a multi-segmented column which carries a continuous recirculation of mobile phase in a direction counter to that of the simulated movement of resin caused by the intermittent rotation of the valve (see FIG. 6). To maintain purity, an additional flush loop is needed to remove feed material remaining in the lines between the valve and column segments prior to their use for removing extract slow product as described in U.S. Pat. No. 3,268,604 (Boyd). Eluent savings result from the reduced flow rate needed for a given contact velocity due to the countercurrent motion of the bed segments (internal reflux). Further savings result if external reflux (liquid recyle) is also used, because the recycled liquid phase is blended with eluent and flowed counter to resin bed movement for efficient removal of the more tightly bound components. Weakly bound ("fast") components are moved along with the liquid phase, and taken off in a raffinate stream.

Figure 7:
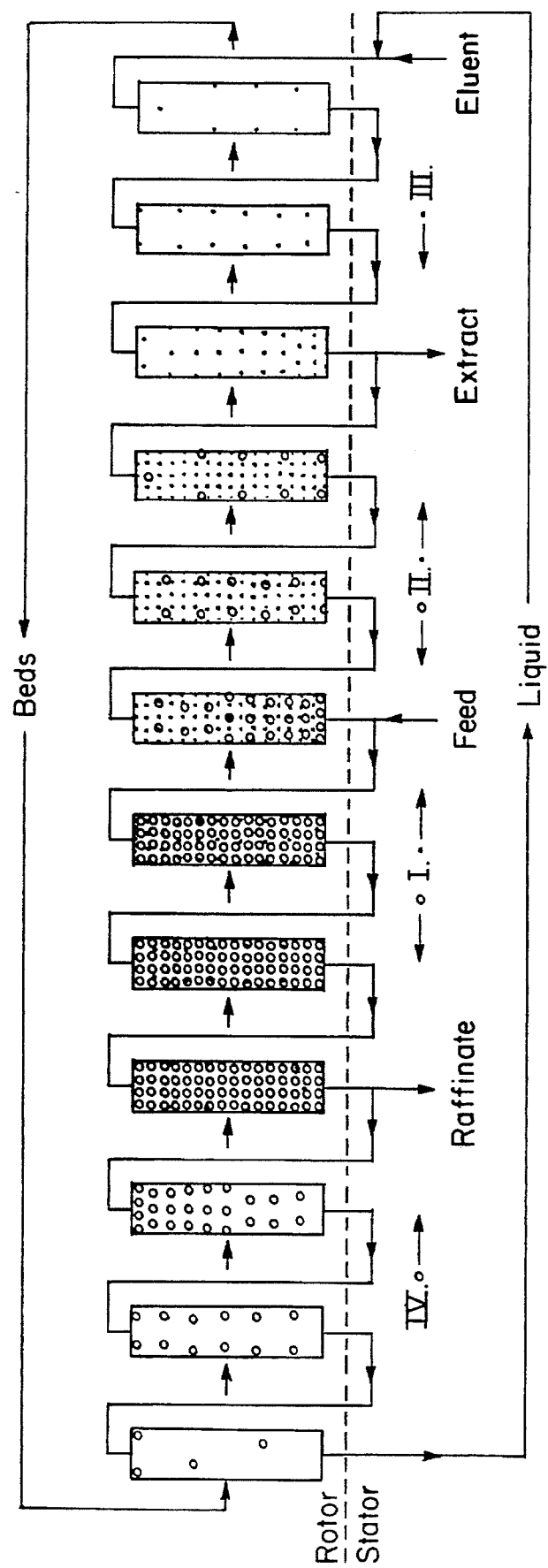
FIG. 7 is a flow schematic diagram of an SMB size exclusion fractionation separation system similar to that of FIG. 6 with internal liquid recycle implemented on a carousel valve system according to the present invention, with components being resolved shown pictorially.
Figure 8:
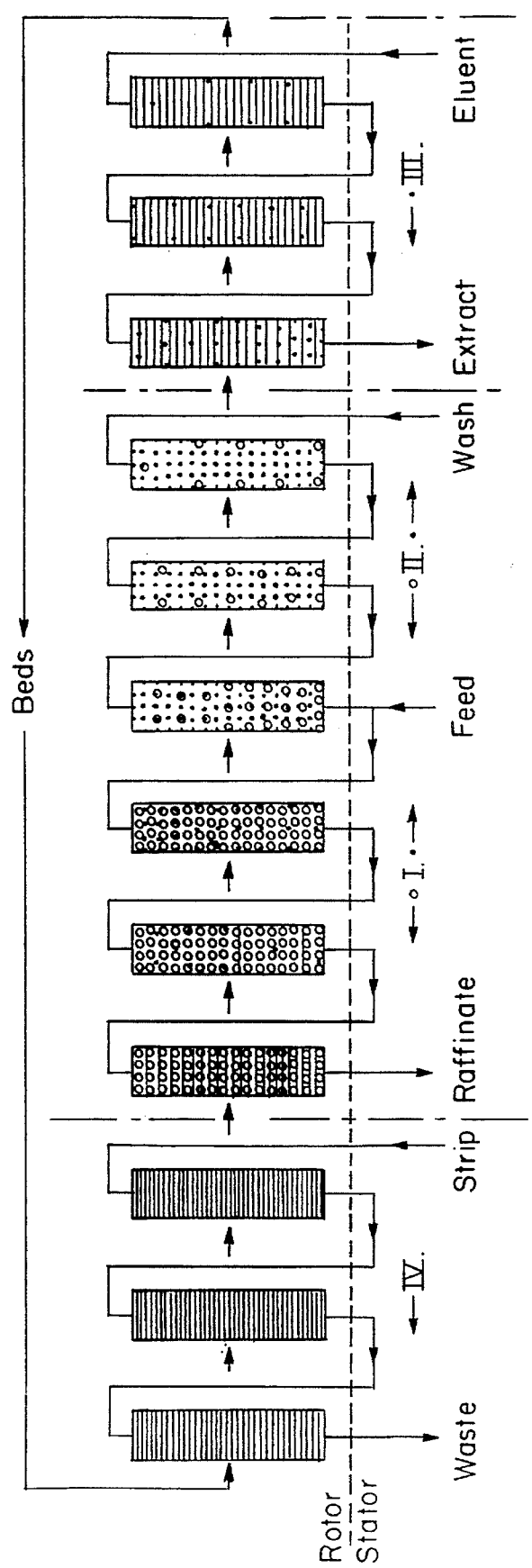
FIG. 8 is a flow schematic diagram of an SMB ion exchange fractionation separation system with separate flowpaths for adorption, desorption and stripping implemented on a carousel valve system according to the present invention, with components being resolved shown pictorially.

With particular reference to FIGS. 7–8, a specific application of counterflow simulated moving bed liquid chromatography using a multi-port slider (rotary) valve is described. This separation scheme is depicted in a 12-bed rotating carousel arrangement, whereby the beds are fed by the sanitizable rotary valve previously described, and adapted to provide two inputs (eluent, feed) and two outputs (raffinate, extract), with a substantial portion of the eluent being recycled. Feed liquid containing both slow (represented as dots) and fast (larger circles) components is introduced at the feed port, located schematically in the middle of zones I–II (the "differential migration" zone). Eluent is continuously flowed in a direction counter to that of the movement of the columns. The slow components are carried mainly by the bed packing, typically a size exclusion-type resin, and the fast components are carried mainly by the eluent. Thus, they move in opposite directions from the feed port. At the border of zones I and IV, the raffinate stream (largely comprising fast component) is taken off through the raffinate port and led to waste or solvent recapture. At the border of zones II and III, extract (containing largely product slow component) is taken off through a similar port. Flow rates of the inputs and outputs are controlled by pumps relative to the switching rate of the beds so as to create the separations shown in each zone.

FIG. 8 is a schematic representation of a typical ion-exchange salt gradient separation. Here, the plumbing is more complicated and requires four inputs (eluent, wash, feed, strip) and three outputs (extract, raffinate, waste). Feed containing the desired product and undesirable by-products and process artifacts is introduced through a feed port intermediate to zones I and II and is immediately channeled into the "slow capture" zone I. Slow components are adsorbed in zone I, and fast unbound components are swept along with the liquid to be removed as a raffinate stream. As the carousel turns the beds pass upstream of the feed port into a wash buffer zone II. This wash step allows "rectification" of the slow and fast components, flushing away entrained unbound fast components from the bound slow components. The bound slow product continues to move with the beds past the wash inlet port into desorption zone III. Here product is desorbed by a stronger eluent, which may have a different ionic strength and/or pH, and comes off in the extract stream at the boundary of zones II and III. An even stronger eluent is then optionally introduced in zone IV to strip the column and desorb strongly bound species from the bed before the next adsorption cycle. Some stripping solution migrates into zone I with the rotation of the carousel, but this material is diluted and washed away by the raffinate stream containing unbound contaminants. One of ordinary skill in the art will be able to determine the concentrations of the various eluents needed to optimize a particular step gradient.

Although the foregoing invention has been described by way of illustration and example for purposes of clarity and understanding, it will be obvious that certain changes and modifications may be practiced within the scope of the invention, as limited only by the scope of the following appended claims.

I claim:

1. A sliding multi-port diaphragm valve, comprising:
   a. a rotor having a body wherein a first inner surface is a stator-facing surface, the rotor body having at least a pair of first and second connection ports in fluid connection with rotor ports located on the stator-facing surface, the rotor having attached to the stator-facing surface a sealing means comprising
   a diaphragm, the diaphragm having a plurality of rotor port sealing means and at least one diaphragm-integral dynamic wipe sealing lip external sealing means;

b. a stator having a body wherein a second inner surface is a rotor-facing surface, the stator body having at least a pair of first and second connection ports in fluid communication with stator ports located on the rotor-facing surface, the stator ports being fluidly connected to their respective connection ports;

c. means for at least one SIP/barrier gutter located on said second inner surface of the valve;

d. orthogonal actuating means for incrementally adjusting the rotor perpendicular to its direction of planar motion;

e. fluid connection means for fluidly connecting stator and rotor connection ports to externally located fluid sources and receivers and to chromatographic separation devices respectively; and f. actuating means for moving the rotor body thereby indexing the ports.

2. A sliding multi-port diaphragm valve, comprising:

a. a stator having a body wherein a first inner surface is a rotor-facing surface, the stator body having at least a pair of first and second connection ports in fluid connection with stator ports located on the rotor-facing surface, the stator having attached to the rotor-facing surface a sealing means comprising
a diaphragm, the diaphragm having a plurality of stator port sealing means and at least one diaphragm-integral dynamic wipe sealing lip external sealing means;

b. a rotor having a body wherein a second inner surface is a stator-facing surface, the rotor body having at least a pair of first and second connection ports in fluid communication with rotor ports located on the stator-facing surface, the rotor ports being fluidly connected to their respective connection ports;

c. means for at least one SIP/barrier gutter located on said second inner surface of the valve;

d. orthogonal actuating means for incrementally adjusting the rotor perpendicular to its direction of planar motion;

e. fluid connection means for fluidly connecting stator and rotor connection ports to externally located fluid sources and receivers and to chromatographic separation devices respectively; and f. actuating means for moving the rotor body thereby indexing the ports.

3. The rotary multi-port diaphragm valve of claim 1 wherein the rotor port sealing means comprises a hole in the diaphragm, the hole being coincident with the rotor port, a hollow sleeve extending away from the hole into the rotor port and defining a fluid passageway, the hollow sleeve terminating in an integral flange gasket, the hole in the diaphragm and sleeve being coaxial and forming a fluid tight passageway.

4. The rotary multi-port diaphragm valve of claim 2 wherein the stator port sealing means comprises a hole in the diaphragm, the hole being coincident with the stator port, a hollow sleeve extending away from the hole into the stator port and defining a fluid passageway, the hollow sleeve terminating in an integral flange gasket, the hole in the diaphragm and sleeve being coaxial and forming a fluid tight passageway.

5. The rotary multi-port diaphragm valve of either claim 1 or 2 wherein the valve is in combination with an actuator shaft for axial rotation of the rotor, the actuator shaft centrally engaging the rotor and additionally movable in a direction substantially orthogonal to the direction of rotation, the actuator shaft being adapted to axially engage an actuator locking nut, the nut being adapted for engaging the rotor at an actuator locking nut engagement shoulder so that the compressing and rotating forces are flexibly projected without regard to exact perpendicularity of the axis of the actuator shaft to the rotor.

6. The rotary multi-port diaphragm valve of either claim 1 or 2 wherein the diaphragm has first and second diaphragm-integral dynamic wipe sealing lips, the lips being located at inboard and outboard edges of the diaphragm, respectively, the lips forming a fluid tight substantially circular barrier at the peripheries of the stator by extension from the rotor to the stator, in operation the sealing lips being urged against the stator face when the rotor and stator are in a first compressed state, and in a second uncompressed state the sealing lips relaxing towards the stator face while maintaining contact with the stator face when the rotor and stator are partially axially separated for sanitization in place.

7. The rotary multi-port diaphragm valve of either claim 1 or 2 having first and second SIP/barrier gutters, wherein said first and second SIP/barrier gutters are located on the diaphragm.

8. The rotary multi-port diaphragm valve of either claim 1 or 2 wherein first and second SIP/barrier gutters are located on the inner surface not having the diaphragm.

9. A rotary multi-port diaphragm valve, comprising:

a. a rotor having a body with a stator-facing surface, the rotor body having at least a pair of first and second connection ports in fluid communication with rotor ports located on the stator-facing surface, the rotor having attached to the stator-facing surface a sealing means;

b. a stator having a body with a rotor-facing surface, the stator body having at least a pair of first and second connection ports in fluid communication with stator ports located on the rotor-facing surface, the stator ports being fluidly connected to their respective connection ports, said stator having make-before-break grooves, said grooves located opposite their respective individual rotor ports and when rotor and stator faces are aligned, fluid communication between said rotor ports and stator make-before-break grooves occurs, said stator also having at least a first and second SIP/barrier port for providing sanitizing or barrier fluids to said stator face through channels that terminate at or near said stator face, said stator having one or more port ledges arranged circumferentially on said stator face, said ledge or ledges each comprising a raised circumferential plateau having a plurality of said make-before-break grooves, each capable of directing fluid flow to or from a single aperture in fluid communication with a single inlet or outlet connection port, said make-before-break grooves each being delimited by a portion of the plateau called a delimiter, said grooves being engaged by rotor ports when the rotor is rotated so that each of said rotor ports engages a groove or two adjoining grooves simultaneously, thereby directing fluid through said grove or grooves and across said delimiters and into or out of said inlet or outlet connection port or ports without interruption of flow, said stator also having at least a first and a second SIP/barrier gutter being in fluid communication with said inlet and outlet SIP/barrier ports, whereby barrier fluid is flowed serially through said gutters while the valve is in port-sealing operation,
c. said sealing means comprising
   i. external sealing means, said external sealing means comprising first and second diaphragm-integral dynamic wipe sealing lips, the lips being located at inboard and outboard edges of the diaphragm, respectively, the lips forming a fluid tight substantially circular barrier at the peripheries of the stator by extension from the rotor to the stator, whereby in operation the sealing lips are urged against the stator face when the rotor and stator are in a first compressed state, and in a second uncompressed state the sealing lips relaxing towards the stator face so as to maintain contact with the stator face when the rotor and stator are orthogonally actuated for sanitization in place;
   ii. rotor port sealing means, said rotor port sealing means comprising a second diaphragm surface, integral diaphragm hollow sleeves and integral diaphragm sanitary flange gaskets;
whereby liquid for sanitization in place is flowed into contact with, and then away from, the rotor/stator interface when the valve is uncompressed, said first gutter contacting an inner port ledge and said second gutter contacting an outer port ledge, and each gutter adjoining one of said external sealing means;
d. orthogonal actuating means for incrementally adjusting the rotor perpendicular to its direction of planar motion;
e. fluid connection means for fluidly connecting stator and rotor connection ports to externally located fluid sources and receivers and to chromatographic separation devices, respectively; and
f. rotating means comprising an actuator shaft rotationally engaged with said rotor and a power means, thereby rotating said rotor upon command to said power means.

10. A rotary multiport diaphragm valve, comprising:
a. a stator having a body with a rotor-facing surface, the stator body having at least a pair of first and second connection ports in fluid communication with stator ports on the rotor-facing surface, the stator ports being fluidly connected to their respective connection ports, said stator having at least an inlet and outlet SIP/barrier port for providing sanitizing or barrier fluids to said stator face through channels that terminate at or near said stator face,
b. a rotor having a body with a stator-facing surface, the rotor body having at least a pair of first and second connection ports in fluid communication with rotor ports located on the stator-facing surface, the rotor having attached to the stator-facing surface a sealing means;
   said rotor having make-before-break grooves, said grooves located opposite their respective individual stator ports and when rotor and stator faces are aligned, fluid communication between said stator ports and rotor make-before-break grooves occurs,
   said rotor having one or more port ledges arranged circumferentially on said rotor face, said ledge or ledges each comprising a raised circumferential plateau having a plurality of said make-before-break grooves, each capable of directing fluid flow to or from a single aperture in fluid communication with a single rotor connection port, said make-before-break grooves each being delimited by a portion of the plateau called a delimiter, said grooves being engaged by stator ports when the rotor is rotated so that each of said stator ports engages a groove or two adjoining grooves simultaneously, thereby directing fluid through said grove or grooves and across said delimiters and into or out of said stator inlet or outlet connection port or ports without interruption of flow,
   said rotor also having at least a first and a second SIP/barrier gutter being in fluid communication with said stator inlet and outlet SIP/barrier ports, whereby barrier fluid is flowed serially through said gutters while the valve is in port-sealing operation,
c. said sealing means comprising
   i. external sealing means, said external sealing means comprising first and second diaphragm-integral dynamic wipe sealing lips, the lips being located at inboard and outboard edges of the diaphragm, respectively, the lips forming a fluid tight substantially circular barrier at the peripheries of the stator by extension from the rotor to the stator, whereby in operation the sealing lips are urged against the stator face when the rotor and stator are in a first compressed state, and in a second uncompressed state the sealing lips relaxing towards the stator face so as to maintain contact with the stator face when the rotor and stator are orthogonally actuated for sanitization in place;
   ii. rotor port sealing means, said rotor port sealing means comprising a second diaphragm surface, integral diaphragm hollow sleeves and integral diaphragm sanitary flange gaskets;
whereby liquid for sanitization in place is flowed into contact with, and then away from, the rotor/stator interface when the valve is uncompressed, said first gutter contacting an inner port ledge and said second gutter contacting an outer port ledge, and each gutter adjoining one of said external sealing means;
d. orthogonal actuating means for incrementally adjusting the rotor perpendicular to its direction of planar motion;
e. fluid connection means for fluidly connecting stator and rotor connection ports to externally located fluid sources and receivers and to chromatographic separation devices, respectively; and
f. rotating means comprising an actuator shaft rotationally engaged with said rotor and a power means, thereby rotating said rotor upon command to said power means.

11. The apparatus of either of claims 1, 2, 9 or 10 wherein said diaphragm is molded in place.

12. The apparatus of either claim 9 or 10 wherein said sealing lips comprise a diaphragm-integral deformable lip seal in combination with an O-ring in contact with the deformable lip, thereby energizing the lip seal.

13. The apparatus of claim 9 or 10 wherein a mid barrier gutter or gutters is/are located between and adjacent to said port ledges, each mid barrier gutter or gutters being in fluid communication with at least two ports and said first and second SIP/barrier gutters, whereby barrier fluid is flowed serially through the gutters while said valve is in operation.

14. The apparatus of claim 9 or 10 wherein said stator face has an inner cap ledge and an outer cap ledge adapted for sealably contacting a sanitary storage cap having inner and outer seals of the same diameter.

15. The apparatus of claim 9 or 10 wherein said stator face has first and second sumps in fluid communication with a sump drain port whereby barrier or SIP fluid escaping from said external sealing means is captured and disposed of.

16. The apparatus of claim 9 or 10 wherein said actuator shaft is terminated by an actuator locking nut, the nut having a shoulder for engaging the rotor at a rotor engagement cone so that the compressing forces are flexibly projected without regard to exact perpendicularity of the axis of the drive shaft to the rotor, thereby facilitating a good rotor-stator contact and seal.

17. In a multi-port sliding valve of the type having a linear slider, a stator having a plurality of connection ports and associated channels in liquid communication with external fluid sources and separation means, the improvement comprising:

a. a sealing means comprising
a diaphragm, the diaphragm having at least one slider port sealing means;

b. at least one connection port capable of being in fluid communication with a source of SIP fluid, and ports comprising channels through the stator body fluidly connected to respective connection ports; and c. orthogonal separation means for partially separating the stator body from the slider body thereby allowing flushing of sanitizing fluid across the stator face without loss of fluid to the outside.

18. The multi-port sliding valve of claim 17 wherein the diaphragm has an integral external dynamic wipe sealing lip sealing the periphery of the slider-stator interface.

19. The multi-port sliding valve of claim 18 wherein the diaphragm-integral dynamic wipe sealing lip comprises at least two lips, the lips being located at inboard and outboard edges of the diaphragm, respectively, the lips forming a fluid tight barrier at the periphery of the stator by extension from the slider to the stator, in operation the sealing lips being urged against the stator face when the slider and stator are in a first compressed state, and in a second uncompressed state the sealing lips bending towards the stator face while maintaining contact with the stator face when the slider and stator are partially separated for sanitization in place, thereby defining an enclosed fluid flow path for sanitizing fluid to flush the wetted surfaces of the stator and of the slider.

\* \* \* \* \*